US012704748B1

(12) United States Patent
Moon et al.

(10) Patent No.: US 12,704,748 B1
(45) Date of Patent: Aug. 11, 2026

(54) RECONFIGURABLE OPTICAL DEVICE HAVING DEVICE ELEMENTS WITH PHASE CHANGE MATERIAL LAYERS AND CORRESPONDING HEATERS CONNECTED TO A CIRCUIT

(71) Applicant: HRL Laboratories, LLC, Malibu, CA (US)

(72) Inventors: Jeong-Sun Moon, Moorpark, CA (US); Kyung-Ah Son, Moorpark, CA (US); Ryan G. Quarfoth, Woodland Hills, CA (US); Hanseung Lee, Newbury Park, CA (US); David H. Chow, Newbury Park, CA (US); Kevin Geary, Santa Monica, CA (US); Chuong V. Dao, Garden Grove, CA (US); Hwa Chang Seo, Torrance, CA (US); Elias A. Flores, Ventura, CA (US)

(73) Assignee: HRL Laboratories, LLC, Malibu, CA (US)

( * ) Notice: Subject to any disclaimer, the term of this patent is extended or adjusted under 35 U.S.C. 154(b) by 279 days.

(21) Appl. No.: 18/515,295

(22) Filed: Nov. 21, 2023

(51) Int. Cl.
*G02F 1/01* (2006.01)

(52) U.S. Cl.
CPC .................................. *G02F 1/0147* (2013.01)

(58) Field of Classification Search
None
See application file for complete search history.

(56) References Cited

U.S. PATENT DOCUMENTS 6,366,254 B1 * 4/2002 Sievenpiper ........... H01Q 21/20 343/770
9,368,720 B1 6/2016 Moon et al.
(Continued)

OTHER PUBLICATIONS

H. Taghinejad et al.; "ITO-based Microheaters for Reversible Multi-stage Switching of Phase-change Materials: Towards Miniaturized Beyond-binary Reconfigurable Integrated Photonics," Optics Express, vol. 29, No. 13, pp. 20449-20467, Jun. 2021, Optical Society of America, Washington, DC, USA.
(Continued)

*Primary Examiner* — Sharrief I Broome
*Assistant Examiner* — Journey F Sumlar
(74) *Attorney, Agent, or Firm* — Wheatstone IP Law Corporation; Milad G. Shara

(57) ABSTRACT

A reconfigurable optical device comprises a plurality of device elements that corresponds to a wavelength λ. The optical device comprises a substrate with an electrical circuit, an isolating dielectric, a field ground metal, a heater plane dielectric, a capping dielectric, and an encapsulating dielectric. Each device element comprises a resistive heater that is surrounded by the heater plane dielectric, a phase change material (PCM) layer comprising a chalcogenide-containing material, an optical antenna disposed atop the PCM layer, a capping portion of the capping dielectric above the resistive heater, and a capping metal above the capping portion and the resistive heater. The field ground metal is between each of the device elements. The encapsulating dielectric surrounds the PCM layer and the optical antenna in each of the device elements. At least three device ele-
(Continued)

ments in the plurality of device elements have their respective resistive heaters connected in series to the electrical circuit.

25 Claims, 11 Drawing Sheets

(56) References Cited

U.S. PATENT DOCUMENTS

| | | | | |
|---|---|---|---|---|
| 9,972,905 | B2 | 5/2018 | Schaffner et al. | |
| 10,439,093 | B2 * | 10/2019 | Yao | H10F 30/2877 |
| 11,187,891 | B1 | 11/2021 | Moon et al. | |
| 11,314,109 | B1 | 4/2022 | Moon et al. | |
| 2002/0176134 | A1 | 11/2002 | Vohra | |
| 2014/0211298 | A1 * | 7/2014 | Sayyah | G01S 7/4817 438/69 |
| 2019/0278112 | A1 * | 9/2019 | Caldwell | G02B 1/08 |
| 2021/0191162 | A1 * | 6/2021 | Bian | G02F 1/0126 |

OTHER PUBLICATIONS

J.S. Moon et al.; "Electrically-Programmable Optical Devices with Phase Change Materials," SPIE Proceedings, 2020.

J.S. Moon et al.; "Reconfigurable Infrared Spectral Imaging with Robust Phase-Change Materials," SPIE Proceedings, 2019.

J.S. Moon et al.; "5 THz Figure-of-Merit Reliable Phase-Change RF Switches for Millimeter-Wave Applications," IEEE MTT-S International Microwave Symposium, Jun. 2018, DOI: 10.1109/MWSYM.2018.8439479, pp. 836-838.

P. Borodulin et al.; "Recent Advances in Fabrication and Characterization of GeTe-Based Phase-Change RF Switches and MMICs," IEEE MTT-S 2017 International Microwave Symposium Digest, 2017, pp. 285-288.

J.S. Moon et al.; "Development toward High-Power Sub-1 Ohm DC-67 Ghz RF Switches Using Phase Change Materials for Reconfigurable RF Front-End," IEEE MTT-S International Microwave Symposium, 2014, DOI: 10.1109/MWSYM.2014.6848334 (3 pages).

O. Hemmatyar et al., "Advanced Phase-Change Materials for Enhanced Meta-Display," ArXiv:2105.01313v1; May 4, 2021; 12 pp.

C.S. Park et al., "Structural Color Filters Based on an All-Dialectric Metasurface Exploiting Silicon-Rich Silicon Nitride Nanodisks," Optics Express, vol. 27, No. 2; Jan. 21, 2019; 13 pp.

S. Kang et al., "Ultra-Narrowband Metamaterial Absorbers for High Spectral Resolution Infrared Spectroscopy," Advance Optical Materials, vol. 7, 180126 (2019); 2018; 8 pp.

Y. Qu et al., "Dynamic Thermal Emission Control Based on Ultrathin Plasmonic Metamaterials Including Phase-Changing Material GST," Laser Photonics Reviews, vol. 11, 1700091; 2017; 6 pp.

A. Tittl et al., "A Switchable Mid-Infrared Plasmonic Perfect Absorber with Multispectral Thermal Imaging Capability," Advanced Materials, vol. 27; 2015; pp. 4597-4603.

* cited by examiner

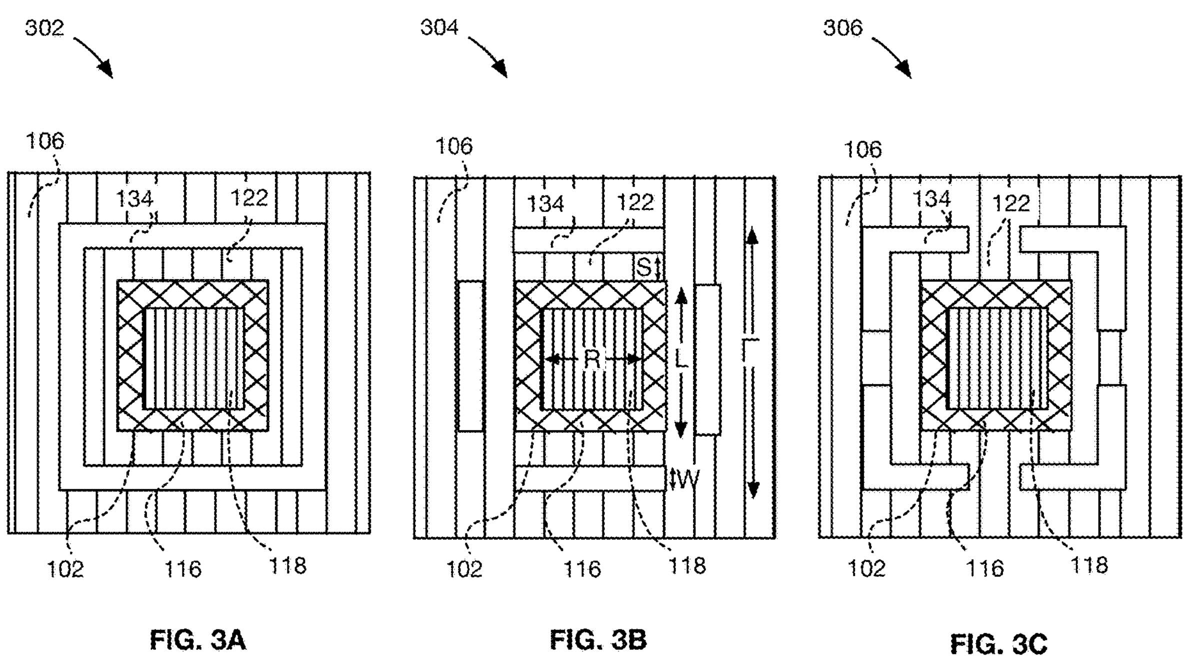
FIG. 3A
FIG. 3B
FIG. 3C
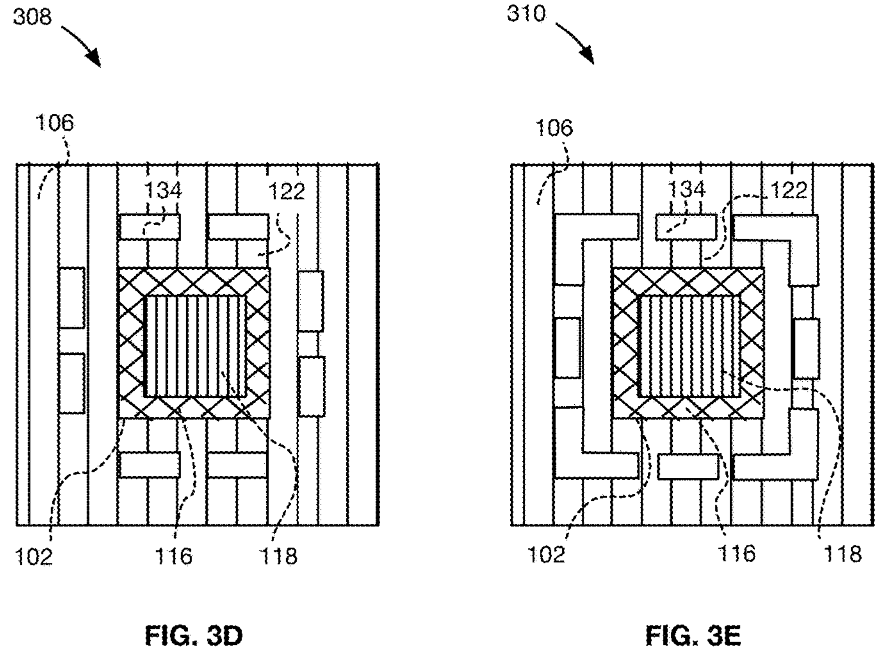
FIG. 3D
FIG. 3E

RECONFIGURABLE OPTICAL DEVICE HAVING DEVICE ELEMENTS WITH PHASE CHANGE MATERIAL LAYERS AND CORRESPONDING HEATERS CONNECTED TO A CIRCUIT

STATEMENT REGARDING FEDERAL FUNDING

This invention was made under U.S. Government contract. The U.S. Government has certain rights in this invention.

TECHNICAL FIELD

This specification is related to reconfigurable optical devices with phase change materials for the infrared and visible regions.

BACKGROUND

Reconfigurable optical devices with nanoscale optical antennas, phase change material and microheaters are being researched for various optical applications in different parts of the infrared (IR) and visible spectral regions. For example, reconfigurable optical applications may include frequency selective surfaces, reconfigurable spectral filtering, and dynamic beam steering.

The phase change material contains an alloy having reversible, non-volatile phases that can be changed between an amorphous state and a polycrystalline state with Joule heating during operation of the reconfigurable optical device. The optical performance can be measured by optical losses and refractive index changes of the phase change material alloy after changing or switching between the amorphous and polycrystalline states. Also, heat loss and power distribution during the Joule heating process are additional performance characteristics of the reconfigurable optical device.

There is a need for reducing optical losses and increasing refractive index changes of the phase change material after switching between amorphous and polycrystalline states to help generate spectrally sharp, tunable resonances. Furthermore, there is a need for reduced heat loss and efficient power distribution during operation of the reconfigurable optical device.

DESCRIPTION OF DRAWINGS

FIGS. 3A-3E illustrate alternate embodiments of thermally isolating dielectrics for the reconfigurable optical device in FIGS. 1A and 2A.

DETAILED DESCRIPTION

FIGS. 1A-6B illustrate embodiments of a reconfigurable optical device comprising a substrate with an electrical circuit and a plurality of device elements that corresponds to a wavelength. The reconfigurable optical device may be used in various optical applications such as frequency selective surfaces, reconfigurable spectral filtering, and dynamic beam steering. Each of the device elements incudes a resistive heater, an optical antenna, a phase change material (PCM) layer, and a capping metal. The phase PCM layer includes a chalcogenide-containing material. The optical antenna is disposed atop the PCM layer. At least three device elements in the plurality of device elements have their respective resistive heaters connected in series to the electrical circuit.

In an embodiment, the antenna, the PCM layer, and the capping metal define an optical resonator in each of the device elements. The optical resonator is tuned to a wavelength λ and the optical antenna functions as a receiver for each device element to reflect or absorb incident wavelength directed at the top surface of the optical device. The optical antenna provides a path for interacting with electromagnetic waves, and is part of the optical system that determines whether incident wavelengths are absorbed or reflected from each device element.

In a multicolor embodiment, the reconfigurable optical device includes 2 or more arrays of device elements. Each array of device elements corresponds to a different wavelength and comprises a plurality of device elements that are interlaced with device elements from the other array or arrays of device elements. The 2 or more arrays of device elements are configured to form a plurality of multicolor unit cells. Each of the multicolor unit cells have one device element from each of the 2 or more arrays of device elements.

The disclosed embodiments include an indexed numbering system with subscripts having lower case letters k, y.z, and n to identify 1) a $k^{th}$ resistive heater cluster from K resistive heater clusters, where the $k^{th}$ resistive heater cluster comprises at least three optical device elements having their respective heaters connected in series; 2) a device element y.z in the $y^{th}$ device element row from Y device element rows and the $z^{th}$ device element column from Z device element columns; and 3) an $n^{th}$ wavelength from N wavelengths.

Figure 1A:
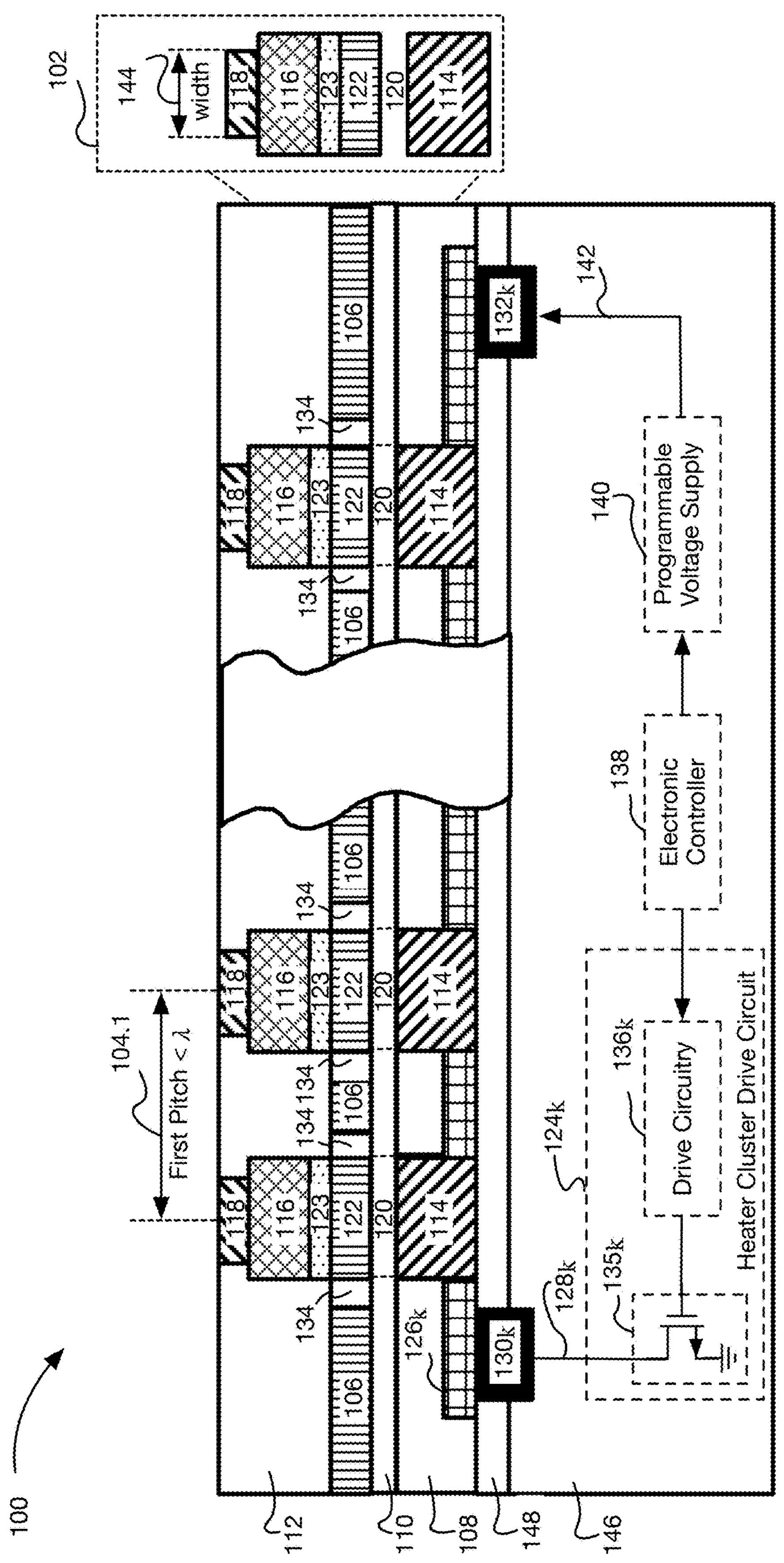
FIGS. 1A-1C are diagrams illustrating an embodiment of a reconfigurable optical device with a plurality of device elements that correspond to a wavelength λ.
Figure 1B:
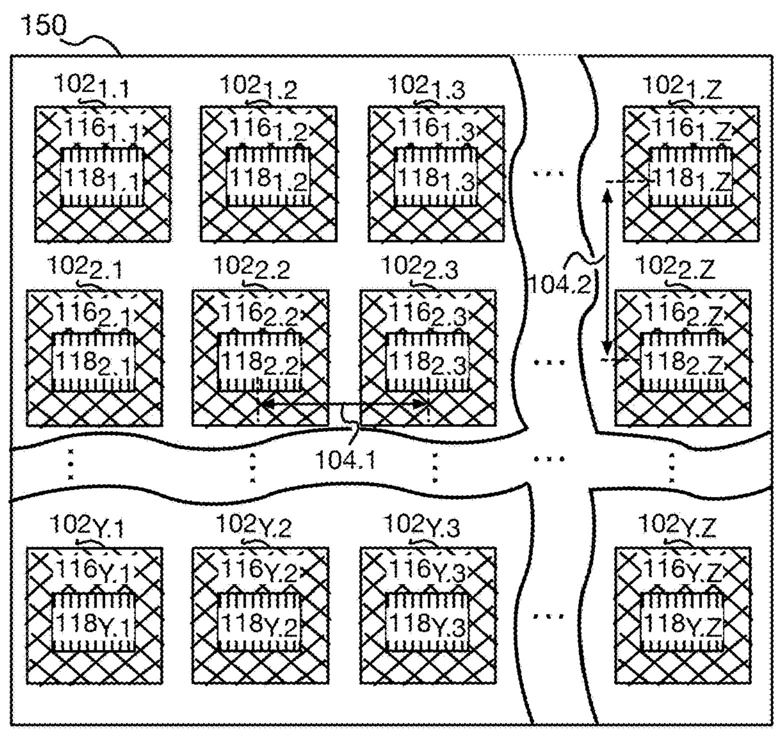
Figure 1C:
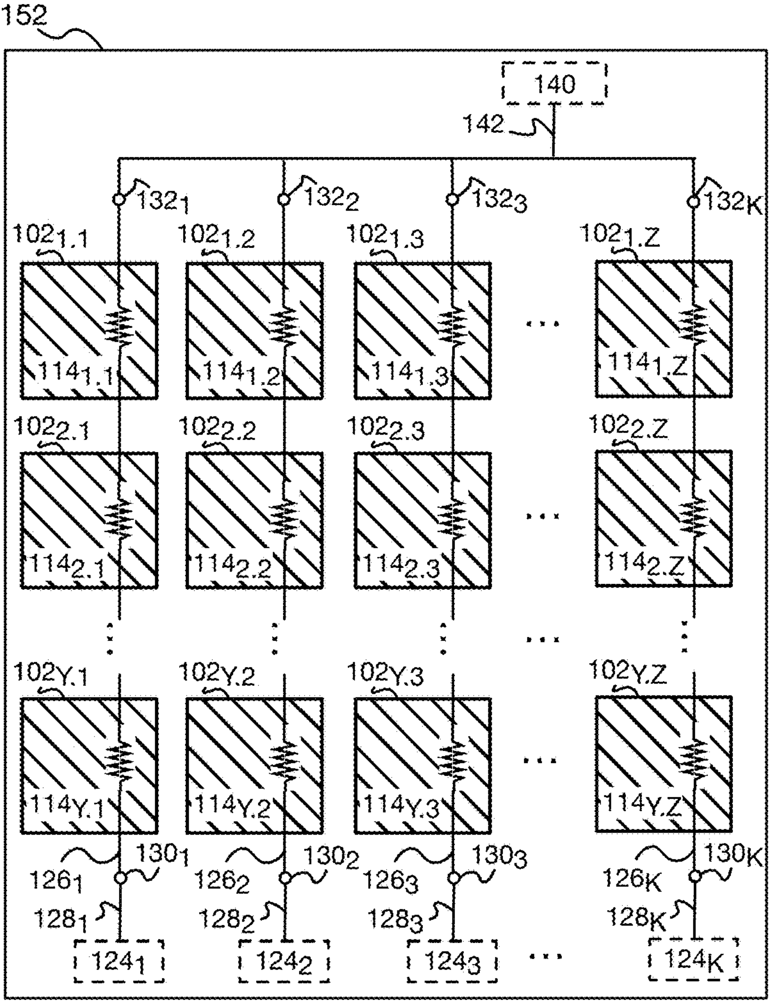

FIGS. 1A-1C are diagrams illustrating an embodiment of a reconfigurable optical device 100 with a plurality of device elements 102 that correspond to a wavelength λ. In the cross-section diagram of FIG. 1A, each of the device elements 102 are separated by a first pitch 104.1 along a first direction and a second pitch 104.2 (shown in top view diagram of FIG. 1B) along a second direction that is not parallel to the first direction. The first pitch 104.1 and the second pitch 104.2 are each less than the wavelength λ. In an embodiment, the first direction of the first pitch 104.1 and the second direction of the second pitch 104.2 are perpendicular.

The reconfigurable optical device 100 includes a field ground metal 106, a heater plane dielectric 108, a capping dielectric 110, an encapsulating dielectric 112, a substrate 146 with an electrical circuit and an isolating dielectric 148.

In an embodiment, the electrical circuit may include a heater cluster drive circuit 124$_k$, an electronic controller 138, and a programmable voltage supply 140. Each device element 102 includes a resistive heater 114 that is surrounded by the heater plane dielectric 108, a phase change material (PCM) layer 116 comprising a chalcogenide-containing material, and an optical antenna 118 disposed atop the PCM layer 116. A capping portion 120 of the capping dielectric 110 is above the resistive heater 114. A capping metal 122 is above the capping portion 120 and the resistive heater 114. The capping metal 122 and the field ground metal 106 are the same material. The field ground metal 106 is between each of the device elements 102. The encapsulating dielectric 112 surrounds the PCM layer 116 and the optical antenna 118. In an embodiment, a passivation layer may be disposed atop the encapsulating dielectric 112. At least three device elements 102 in the plurality of device elements 102 have their respective resistive heaters 114 connected in series to form a $k^{th}$ resistive heater cluster. The $k^{th}$ resistive heater cluster is connected to a heater cluster drive circuit 124$_k$.

According to an embodiment, the optical device 100 includes a first via 130$_k$ and an interconnect wire 126$_k$ that interconnects the at least three resistive heaters 114 of the $k^{th}$ heater cluster in series. The interconnect wire 126$_k$ comprises a first end connected to the first via 130$_k$, intermediate portions connecting resistive heaters 114, and a second end connected to the second via 132$_k$. The first via 130$_k$ and second via 132$_k$ are connected to an electrical circuit in the substrate 146. The heater cluster drive circuit 124$_k$ is configured to enable electrical pulses 128$_k$ to at least three resistive heaters 114 for changing the material phase of the PCM layers 116 to amorphous or polycrystalline in the respective plurality of devices 102. For each device element 102, about 60% to 100% of the incident light at wavelength λ may be reflected when the PCM layer 116 is polycrystalline and about 0% to 40% of the incident light at wavelength λ may be reflected when the PCM layer 116 is amorphous.

The chalcogenide-containing material for the PCM layer 116 may be selected from the group consisting of SbS, SbSe, SbTe, or an alloy thereof. In an embodiment, the PCM layer 116 is a tellurium-free chalcogenide-containing material such as SbS or SbSe, and the optical antenna 118 may include a dielectric material, for optical applications in the near infrared (NIR) or visible spectrum. The Se-based PCM material offers a large optical band gap of greater than 1 eV suitable for optical applications in the NIR wavelength. The S-based PCM material offers a larger bandgap of ~1.5 eV suitable for optical applications in the visible spectrum. In another embodiment, the PCM layer 116 is a tellurium-based chalcogenide-containing material such as SbTe or doped-SbTe, and the optical antenna 118 may include a metallic material, for optical applications in the mid-wave infrared (MWIR) or the longwave infrared (LWIR) spectrum. The doped-SbTe chalcogenide PCM may be a ternary or quaternary material containing elements in addition to Sb and Te. For example, a doped-SbTe chalcogenide material may include GeSbTe.

Other alloys of chalcogenide-containing material for the PCM layer 116 may include a) germanium-based alloys, GeTe and GST, which exhibit a change between metallic and dielectric response in the visible spectrum; b) gallium (Ga) and germanium (Ge) based chalcogenides incorporating sulfur and selenium, namely, gallium lanthanum sulfide (GLS) and GeSbSeTe (GSST), which exhibit strictly dielectric responses over the visible and the NIR spectral ranges, and c) indium and antimony based chalcogenides including AgInSbTe (AIST).

The reconfigurable optical device 100 may include a thermally isolating dielectric 134. For each device element 102, the thermally isolating dielectric 134 at least partially separates the capping metal 122 above the resistive heater 114 from the field ground metal 106. In an embodiment, each device element 102 may include an interfacial layer 123 between the capping metal 122 and the PCM layer 116. In one embodiment, the interfacial layer 123 has a thickness $<\lambda/50$. In other embodiments, there is no thermally isolating dielectric 134, and the field ground metal 106 and capping metal 122 are in direct contact.

The heater plane dielectric 108 and the capping dielectric 110 may be the same material such as $SiN_x$ or $SiO_2$. The optical antenna 118 may include a metal material such as Au, Al, Pt, Cr, or Cu. Alternatively, the optical antenna 118 may include a dielectric material such as SiN, Ge, Si or $TiO_2$. The capping metal 122 and the field ground metal 106 may include a metal material such as Au, Al, Pt, Cr, or Cu that form a broadband optical reflector serving as an electrical ground plane. The resistive heater 114 may be a TiW resistive heater.

In an embodiment, the structure dimensions of the optical device 100 are sub-wavelength in magnitude. For the example, the optical device optical antenna 118 may have a width that is less than or equal to the wavelength λ/5. The PCM layer 116 may have a width that is less than or equal to the wavelength λ/4. The resistive heater 114 may have a width that is less than or equal to the wavelength λ/3. The dimensions of the optical antenna 118, such as antenna width 144, or the PCM layer 116, such as layer thickness, may be scaled to tune the optical device 102 for the wavelength λ.

In an embodiment of a Joule heating process, the heater cluster drive circuit 124$_k$ may enable the electrical pulses 128$_k$ to the at least three resistive heaters 114 of the $k^{th}$ heater cluster for changing the phase of the PCM layer 116 between an amorphous phase and a polycrystalline phase.

In an embodiment for switching PCM layers 116 associated with the $k^{th}$ heater cluster from polycrystalline phase to amorphous phase, the electronic controller 138 configures the programmable voltage supply 140 to provide a supply voltage 142 having a reset voltage $V_{reset}$, about 6V, to the second via 132$_k$. The electronic controller 138 configures the heater cluster drive circuit 124$_k$ to provide a short interval enable signal, about 300 ns, to a transistor 135$_k$. While the transistor 135$_k$ is enabled, the electrical pulses 128$_k$ flow through first via 130$_k$, the interconnect wire 126$_k$, and the $k^{th}$ heater cluster, causing power dissipation in, and thus heating of, the $k^{th}$ heater cluster. Also, the electrical pulses 128$_k$ generate a reset pulse energy that causes the temperature for each of the PCM layers 116 to rise above the amorphization temperature, about 600° C., where the PCM layers 116 melt and then followed by a rapid thermal quench that produces the amorphous phase.

For switching PCM layers 116 associated with the $k^{th}$ heater cluster from the amorphous phase to the polycrystalline phase, the electronic controller 138 configures the programmable voltage supply 140 to provide the supply voltage 142 having a lower set voltage $V_{set}$, about 4V, to the second via 132$_k$. The electronic controller 138 configures the heater cluster drive circuit 124$_k$ to provide a longer interval enable signal, about 1 μs, to the transistor 135$_k$. While the transistor 135$_k$ is enabled, the electrical pulses 128$_k$ flow through first via 130$_k$, the interconnect wire 126$_k$, and the $k^{th}$ heater cluster, causing power dissipation in, and thus heating of, the $k^{th}$ heater cluster. Also, the electrical pulses 128$_k$ generate a set pulse energy that causes the temperature for each of the PCM layers 116 to rise above the crystallization temperature, about 160° C., and produce the polycrystalline phase.

In an embodiment, during the PCM amorphous phase of each device element 102, when the incident wavelength is matched with a tuned wavelength of the device element 102, energy from the incident wavelength will be absorbed in the PCM layer 116. The optical antenna 118 is capacitively coupled to the capping metal 106 and the PCM layer 116 absorbs a target incident wavelength. The impedance of the PCM layer 116 and the optical antenna 118 during the amorphous phase is about 377 ohms/square according to an embodiment. During the PCM polycrystalline phase of each device element 102, the material phase of the PCM layer 116 is polycrystalline. The PCM layer 116 has a low resistance and the optical antenna 118 is shunted to the capping metal 122, and the capping metal 122 reflects the incident wavelength. The impedance of the PCM layer 116 and the optical antenna 118 during the polycrystalline phase is about 20 ohms/square according to an embodiment.

FIG. 1B shows a top view 150 of the reconfigurable optical device 100 of FIG. 1A comprising a plurality of device elements $\mathbf{102}_{1.1}$ to $\mathbf{102}_{Y.Z}$. The field ground metal 106 is between each of the device elements $\mathbf{102}_{y.z}$. Each of the device elements $\mathbf{102}_{y.z}$ is separated by the first pitch 104.1 along a first direction and the second pitch 104.2 along a second direction that is not parallel to the first direction. Top view 150 shows the optical antenna $\mathbf{118}_{y.z}$ disposed atop the PCM layer $\mathbf{116}_{y.z}$ in each device element $\mathbf{102}_{y.z}$.

FIG. 1C shows an electrical schematic view 152 of the plurality of device elements $\mathbf{102}_{1.1}$ to $\mathbf{102}_{Y.Z}$ in the top view 150. The electrical schematic view 152 illustrates an embodiment of the at least three resistive heaters $\mathbf{114}_{y.z}$ of the $k^{th}$ heater cluster connected in series through interconnect wire $\mathbf{126}_k$ to the heater cluster drive circuit $\mathbf{124}_k$. The interconnect wire $\mathbf{126}_k$ comprises a first end connected to the first via $\mathbf{130}_k$, intermediate portions connecting successive resistive heaters 114, and a second end connected to the second via $\mathbf{132}_k$. The programmable voltage supply 140 provides the supply voltage 142 to the second via $\mathbf{132}_k$. The electrical pulses $\mathbf{128}_k$ are enabled by the heater cluster drive circuit $\mathbf{124}_k$ to the least three resistive heaters $\mathbf{114}_{y.z}$ for providing the electrical energy to change the material phase of the PCM layers $\mathbf{116}_{y.z}$ to amorphous or polycrystalline in the respective plurality of devices $\mathbf{102}_{y.z}$. FIG. 1C illustrates an embodiment for each of the $k^{th}$ heater clusters comprising a single physical column or string of resistive heaters $\mathbf{114}_{y.z}$. According to an embodiment, each of the $k^{th}$ heater clusters may comprise more than one physical column or string of resistive heaters $\mathbf{114}_{y.z}$, which may be wired in parallel.

Figure 2A:
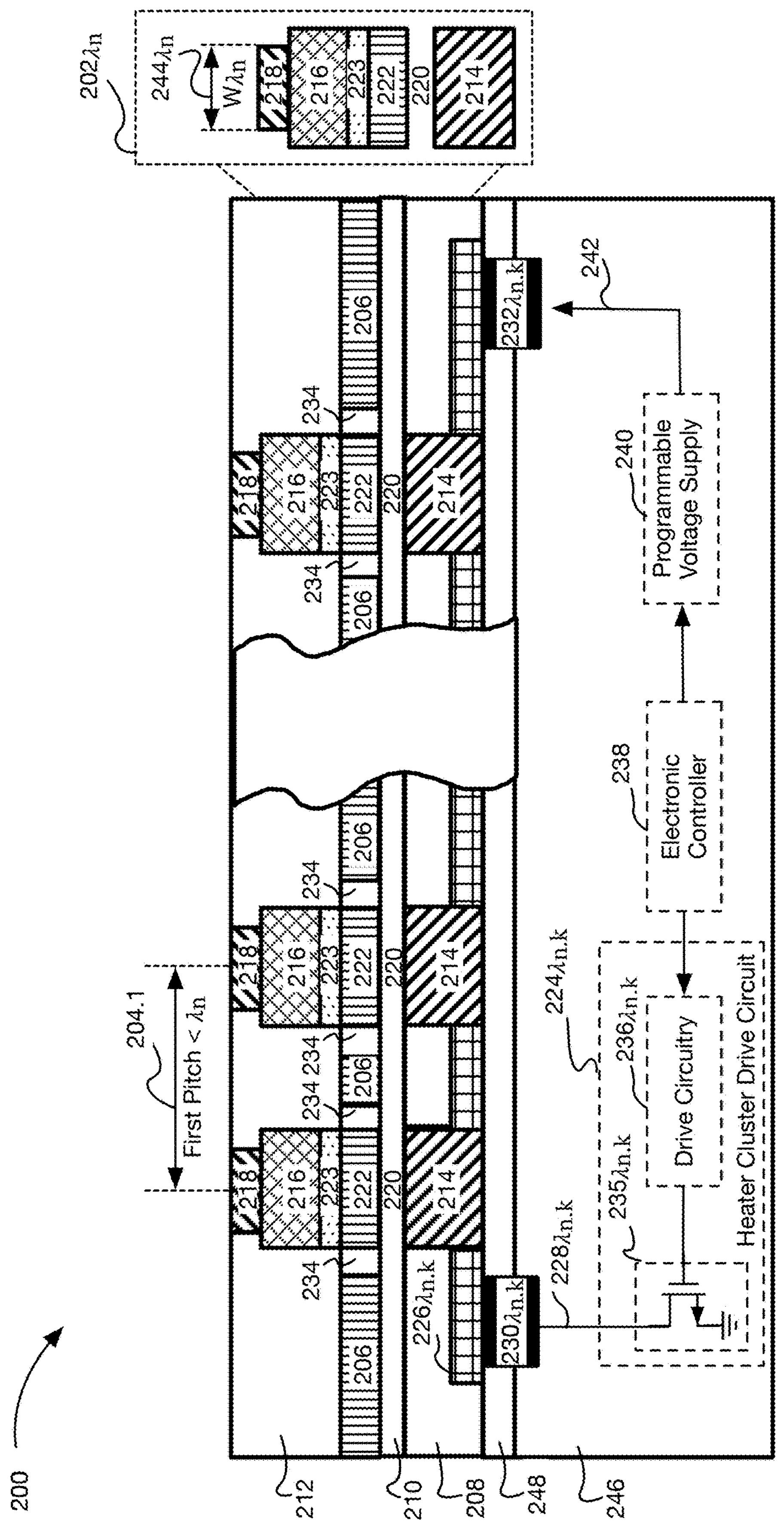
FIGS. 2A-2C are diagrams illustrating an embodiment of a reconfigurable optical device with a plurality of $n^{th}$ device elements that correspond to an $n^{th}$ wavelength $\lambda_n$.
Figures 2B, 2C:
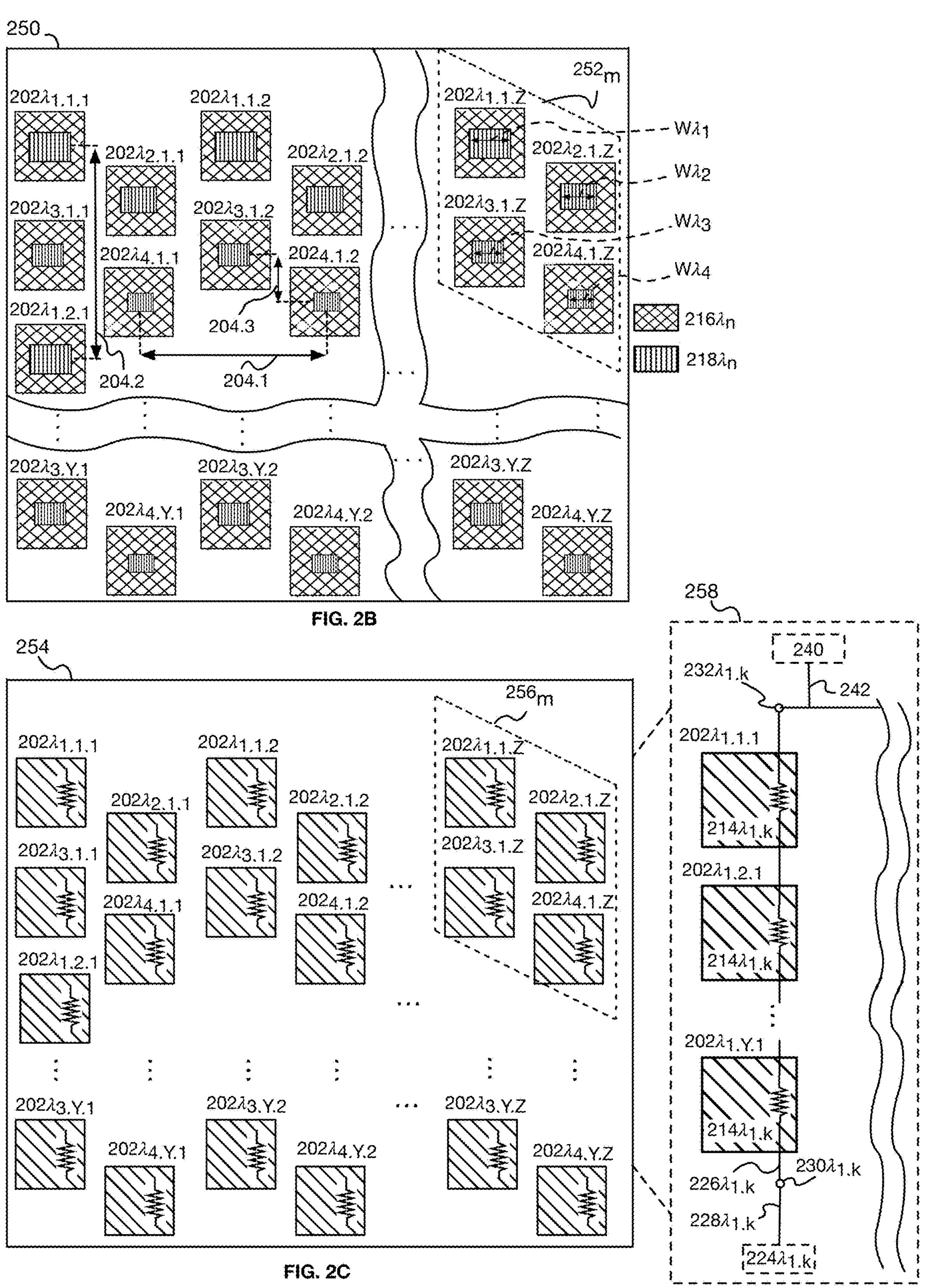

FIGS. 2A-2C are diagrams illustrating an embodiment of a reconfigurable optical device 200 with a plurality of $n^{th}$ device elements $\mathbf{202}\lambda_n$ that corresponds to an $n^{th}$ wavelength $\lambda_n$. The subscript n is an integer 1 to N, and N is an integer of 2 or more and corresponds to the number of wavelengths that are reconfigurable to a reflective or absorbing state for the optical device 200. The reconfigurable optical device 200 illustrates an embodiment of N=4 wavelengths and $\lambda_n$ is wavelengths $\lambda_1$, $\lambda_2$, $\lambda_3$, and $\lambda_4$. Each of the device elements $\mathbf{202}\lambda_n$ are separated by a first pitch 204.1 along a first direction and a second pitch 204.2 (shown in top view 250 of FIG. 2B) along a second direction that is not parallel to the first direction. The first pitch and the second pitch are each less than the wavelength $\lambda_n$.

In FIG. 2A, the reconfigurable optical device 200 includes a field ground metal 206, a heater plane dielectric 208, a capping dielectric 210, an encapsulating dielectric 212, a substrate with an electrical circuit 246, and an isolating dielectric 248. Each device element $\mathbf{202}\lambda_n$ in the plurality of device elements $\mathbf{202}\lambda_n$ comprises a resistive heater 214 that is surrounded by the heater plane dielectric 208, a PCM layer 216 comprising a chalcogenide-containing material, and an optical antenna 218 disposed atop the PCM layer 216. Each device element 202 further comprises a capping portion 220 of the capping dielectric 210 above the resistive heater 214, and a capping metal 222 above the capping portion 220 and the resistive heater 214. The capping metal 222 and the field ground metal 206 are the same material.

At least one dimension of either the PCM layer 216 or the optical antenna 218 in the optical device $\mathbf{202}\lambda_n$ is tuned to the $n^{th}$ wavelength $\lambda_n$. In an embodiment, the optical antenna 218 has a dimension $\mathbf{244}\lambda_n$ for an antenna width $W\lambda_n$ that is scaled for tuning the optical device element to $\mathbf{202}\lambda_n$ to the $n^{th}$ wavelength $\lambda_n$. Alternatively, the thickness of the PCM layer 216 may be scaled for tuning the optical device element to $\mathbf{202}\lambda_n$ to the $n^{th}$ wavelength $\lambda_n$.

The field ground metal 206 is between each of the $n^{th}$ device elements $\mathbf{202}\lambda_n$. The encapsulating dielectric 212 surrounds the PCM layer 216 and the optical antenna 218 in each of the $n^{th}$ device elements $\mathbf{202}\lambda_n$. At least three device elements $\mathbf{202}\lambda_n$ in the plurality of $n^{th}$ device elements $\mathbf{202}\lambda_n$ have their respective resistive heaters 214 connected in series to form a $k^{th}$ resistive heater cluster. The $k^{th}$ resistive heater cluster is connected by the first via $\mathbf{230}_k$ and the second via $\mathbf{232}_k$ to an electrical circuit in the substrate 246. In an embodiment, the $k^{th}$ resistive heater cluster is connected to a $k^{th}$ heater cluster drive circuit $\mathbf{224}\lambda_{n.k}$ that is associated with the $n^{th}$ wavelength.

The embodiments for each of the wavelength configurations in the optical device 200 may include the embodiments of the optical device 100. For example, the Joule heating process may be used for changing the phase of the PCM layer 216 between an amorphous phase and a polycrystalline phase in the optical device 200. In an embodiment for switching PCM layers 216 associated with the $k^{th}$ cluster of resistive heaters $\mathbf{214}\lambda_{n.k}$ from polycrystalline phase to amorphous phase, an electronic controller 238 configures a programmable voltage supply 240 to provide a supply voltage 242 having a reset voltage $V_{reset}$, about 6V, through the second via $\mathbf{232}\lambda_{n.k}$ to interconnect wire $\mathbf{226}\lambda_{n.k}$. The electronic controller 238 configures the heater cluster drive circuit $\mathbf{224}\lambda_{n.k}$ to provide a short interval enable signal, about 300 ns, to a transistor $\mathbf{235}\lambda_{n.k}$. While the transistor $\mathbf{235}\lambda_{n.k}$ is enabled, the electrical pulses $\mathbf{228}\lambda_{n.k}$ flow through the first via $\mathbf{230}\lambda_{n.k}$, the interconnect wire $\mathbf{226}\lambda_{n.k}$, and the $k^{th}$ heater cluster, causing power dissipation in, and thus heating of, the $k^{th}$ heater cluster. Also, the electrical pulses $\mathbf{228}\lambda_{n.k}$ generate a reset pulse energy that causes the temperature for each of the PCM layers 216 to rise above the amorphization temperature, about 600° C., where the PCM layers 216 melt and then followed by a rapid thermal quench that produces the amorphous phase.

In an embodiment for switching PCM layers 216 associated with the $k^{th}$ heater cluster of resistive heaters $\mathbf{214}\lambda_{n.k}$ from amorphous phase to the polycrystalline phase, the electronic controller 238 configures the programmable voltage supply 240 to provide the supply voltage 242 having a lower set voltage $V_{set}$, about 4V, through the second via $\mathbf{232}\lambda_{n.k}$ to interconnect wire $\mathbf{226}\lambda_{n.k}$. The electronic controller 238 configures the heater cluster drive circuit $\mathbf{224}\lambda_{n.k}$ to provide a longer interval enable signal, about 1 μs, to the transistor $\mathbf{235}\lambda_{n.k}$. While the transistor $\mathbf{235}\lambda_{n.k}$ is enabled during the longer time interval, the electrical pulses $\mathbf{228}\lambda_{n.k}$ flow through the first via $\mathbf{230}\lambda_{n.k}$, the interconnect wire $226\lambda_{n.k}$, and the $k^{th}$ heater cluster, causing power dissipation in, and thus heating of, the $k^{th}$ heater cluster. Also, the electrical pulses 228$\lambda_{n.k}$ generate a set pulse energy that causes the temperature for each of the PCM layers 216 to rise above the crystallization temperature, about 160° C., and produce the polycrystalline phase.

The reconfigurable optical device 200 may include a thermally isolating dielectric 234. For each device element 202$\lambda_n$, the thermally isolating dielectric 234$\lambda_n$ at least partially separates the capping metal 222$\lambda_n$ above the resistive heater 214$\lambda_n$ from the field ground metal 206. Each optical device element 202$\lambda_n$ may include an interfacial layer 223$\lambda_n$ between the capping metal 222$\lambda_n$ and the PCM layer 216$\lambda_n$. In one embodiment, the interfacial layer 223$\lambda_n$ has a thickness $<\lambda/50$.

FIG. 2B shows a top view 250 of the reconfigurable optical device 200 comprising an array of multi-color unit cells 252$_M$. The array of multi-color unit cells 252$_M$ comprises a plurality of $n^{th}$ device elements 202$\lambda_{n.Y/Z}$ where n is illustrated as an embodiment of 4 wavelengths $\lambda_1$, $\lambda_2$, $\lambda_3$, and $\lambda_4$ that are reconfigurable to a reflective or absorbing state for the optical device 200.

The array of multi-color unit cells 252$_M$ comprises (i) a plurality of $1^{st}$ device elements 202$\lambda_{1.1.1}$ to 202$\lambda_{1.Y.Z}$ that correspond to the wavelength $\lambda_1$; (ii) a plurality of $2^{nd}$ device elements 202$\lambda_{2.1.1}$ to 202$\lambda_{2.Y.Z}$ that correspond to the wavelength $\lambda_2$; (iii) a plurality of $3^{rd}$ device elements 202$\lambda_{3.1.1}$ to 202$\lambda_{3.Y.Z}$ that correspond to the wavelength $\lambda_3$; and (iv) a plurality of $4^{th}$ device elements 202$\lambda_{4.1.1}$ to 202$\lambda_{4.Y.Z}$ that correspond to the wavelength $\lambda_4$. Each of the device elements 202$\lambda_{n.y.z}$ are separated by a first pitch 204.1 along a first direction and a second pitch 204.2 along a second direction that is not parallel to the first direction. The first pitch and the second pitch are each less than the wavelength $\lambda_n$. As the first pitch and second pitch are less than every n of N wavelengths, the first pitch and second pitch are thus less than the shortest of the N wavelengths. The $n^{th}$ device elements 202$\lambda_n$ are interlaced with other device elements. For example, the $n^{th}$ device elements 202$\lambda_{n.Y.Z}$ are interlaced with $q^{th}$ device elements that correspond to a $q^{th}$ wavelength $\lambda_q$, where q is an integer 1 to N and q does not equal n. In an embodiment, the $n^{th}$ device elements 202$\lambda_{n.Y.Z}$ in each multi-color unit cell 252$_m$ are offset from other device elements by $\lambda_n/4$, as shown at 204.3, for reducing spectral cross-talk or shift.

Each multi-color unit cell 252$_m$ comprises optical device elements 202$\lambda_{1.y.z}$, 202$\lambda_{2.y.z}$, 202$\lambda_{3.y.z}$, and 202$\lambda_{4.y.z}$, where the optical antenna dimension $W_{\lambda n}$ is different for each optical device element 202$\lambda_{n.y.z}$ and is tuned to the wavelength $\lambda_n$. The multi-unit color cell 252$_m$ illustrates each of the device elements 202$\lambda_{n.y.z}$ having the same dimensions for the respective PCM layers 218$\lambda_n$, and different width dimensions $W\lambda_1$, $W\lambda_2$, $W\lambda_3$, and $W\lambda_4$ for the respective optical antennas 218$\lambda_n$. Alternatively, the multi-unit color cell 252$_m$ may include each of the device elements 202$\lambda_{ny.z}$ having the same dimensions for the respective optical antennas 218$\lambda_n$, and different width or thickness dimensions for the respective PCM layers 218$\lambda_n$.

Each multi-color unit cell 252$_m$ may have 16 configurations, shown in the table below, which reflect the two possible states of amorphous or polycrystalline phases for the PCM layer 202$\lambda_n$ in each of the four device elements 202$\lambda_{1.y.z}$, 202$\lambda_{2.y.z}$, 202$\lambda_{3.y.z}$, and 202$\lambda_{4.y.z}$:

Configurations for Multi-unit Color Cell $252_m$ (amorphous-PCM referred to "0" and polycrystalline-PCM referred to 1)

| Configurations | $202\lambda_{1.y.z}$ | $202\lambda_{2.y.z}$ | $202\lambda_{3.y.z}$ | $202\lambda_{4.y.z}$ |
|---|---|---|---|---|
| 1 | 0 | 0 | 0 | 0 |
| 2 | 0 | 0 | 0 | 1 |
| 3 | 0 | 0 | 1 | 0 |
| 4 | 0 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 1 | 0 | 0 | 0 |
| 10 | 1 | 0 | 0 | 1 |
| 11 | 1 | 0 | 1 | 0 |
| 12 | 1 | 0 | 1 | 1 |
| 13 | 1 | 1 | 0 | 0 |
| 14 | 1 | 1 | 0 | 1 |
| 15 | 1 | 1 | 1 | 0 |
| 16 | 1 | 1 | 1 | 1 |

FIG. 2C shows an electrical schematic view 254 of the plurality of $n^{th}$ device elements 202$\lambda_{n.y.z}$ corresponding to the top view 250 of FIG. 2B. In each multi-color unit cell 256$_m$, each of the device elements 202$\lambda_{n.y.z}$ have their respective resistive heaters 214$\lambda_{n.k}$ connected to the heater cluster drive circuit 224$\lambda_{n.k}$ that corresponds to the wavelength $\lambda_n$. Electrical schematic 258 illustrates an embodiment of at least three device elements 202$\lambda_{1.1.1}$ to 202$\lambda_{1.Y.1}$ in the plurality of $1^{st}$ device elements 202$\lambda_1$ having their respective resistive heaters 214$\lambda_{n.k}$ connected in series to form a $k^{th}$ resistive heater cluster that corresponds to wavelength $\lambda_1$. The $k^{th}$ heater cluster drive circuit 224$\lambda_{n.k}$ is configured to enable the electrical pulses 228$\lambda_{1.k}$ to the resistive heaters 214$\lambda_{1.k}$ for changing the phase of the associated PCM layers 216 between an amorphous phase and a polycrystalline phase.

For switching PCM layer 216 between polycrystalline phase and amorphous phase, the programmable voltage supply 240 provides the supply voltage 242 of $V_{reset}$, about 6V, for the amorphous phase or the supply voltage 242 of $V_{set}$, about 4V, for the polycrystalline phase to the second via 232$\lambda_{n.k}$. For changing to the amorphous phase, the heater cluster drive circuit 224$\lambda_{n.k}$ provides a short interval enable signal, about 300 ns, through the first via 230$\lambda_{n.k}$ to the $k^{th}$ heater cluster of resistive heaters 214$\lambda_{n.k}$. For changing to the polycrystalline phase, the heater cluster drive circuit 224$\lambda_{n.k}$ provides a longer interval enable signal, about 1 μs, through the first via 230$\lambda_{n.k}$ to the $k^{th}$ heater cluster of resistive heaters 214$\lambda_{n.k}$.

FIGS. 3A-3E are top views 302-310 of optical device 102 of FIG. 1A with alternate embodiments of thermally isolating dielectric 134. These alternate embodiments of thermally isolating dielectric 134 may also be used in the optical device 202 of FIG. 2A.

The thermally isolating dielectric 134 at least partially separates the capping metal 122 (above the resistive heater 114) the field ground metal 106. In an embodiment, the thermally isolating dielectric 134 has four-fold symmetry about an axis through the center of the antenna 118. The various structure embodiments of the thermally isolating dielectric 134 may include rectangular, circular, oval, elliptical, polygonal, or hexagonal structures with closed loop or slotted configurations. The thermally isolating dielectric 134 may include thermally isolating dielectric segment lengths that are less than or equal to wavelength $\lambda/2$. The width of the thermally isolating dielectric 134 may be less than or equal to the wavelength $\lambda/5$.

FIG. 3A illustrates an embodiment where the thermally isolating dielectric 134 forms a closed loop that fully separates the capping metal 122 from the field ground metal 106.

FIGS. 3B-3E illustrate alternate embodiments where the thermally isolating dielectric 134 comprises at least 4 breaks occurring at regular intervals such that there are at least 4 locations of contact between the capping metal 122 above the resistive heater 114 the field ground metal 106. The thermally isolating dielectric 134 may include additional thermal isolations features depending on the size of the optical device so that the slots do not interact with the incident wave.

The thermally isolating dielectric 134 may be used so that heat from the heaters 114 is efficiently coupled to the PCM layer 116 with minimal thermal conduction to the field ground metal 106. This allows the change of phase of the PCM layer 116 to be done with a minimal expenditure of energy.

In FIG. 3A, thermally isolating dielectric 134 may provide excellent thermal isolation as there are good thermal insulators around the heater 114 (below the capping metal 122) and the optical device element 102 that prevent heat from leaking on the thermally conductive ground layer 106. However, this configuration might have a tradeoff with meeting IR/optical performance demands. The length of the IR/optical device element 102 may be on the order of $\lambda_D/2$, where $\lambda_D$ is the wavelength of light in the dielectric at the mirror or filter operating point. Many PCM materials have index of refraction in the range of n=2 to 5 and thus the length of the filter is $\lambda_0/10$ to $\lambda_0/4$. Where $\lambda_0$ is the wavelength of light in free space. The ring shape embodiment of thermally isolating dielectric 134 surrounding the optical device element 102 may be sufficiently large to strongly-interact with the incoming light. Ring-shaped openings in a ground-plane may strongly couple to incident fields if the total perimeter length is equal to the wavelength $\lambda_P$, where $\lambda_P$ is the wavelength of the passivation material which exists in the ring. If multiple materials exist near the ring then $\lambda_P$ could instead be an averaged value for the dielectric/oxide layer, passivation layer, and air. Based on available passivation and dielectric materials which often have indexes from n=1.5 to 3, the perimeter of the isolation feature in this configuration is ~$\lambda_0/2$ to $3\lambda_0$. For some configurations, this isolation structure may be optically acceptable (i.e. perimeter$<\lambda_0$), but other configurations might have perimeters that are too large and may strongly interact with the incident wave. This interaction may cause diffracting modes, along with transmission into the substrate, and both of these phenomena may represent loss mechanisms for a desired optical operation. This may render the filter or mirror function of the optical device non-functional.

In FIG. 3B, the thermally isolating dielectric 134 shown in top view 304 is similar to the thermally isolating dielectric shown in top view 302, except that the corners are removed so that there are 4 discrete slots instead of a continuous ring around the optical device element 102. The discrete slots interact with incoming plane wave when their length $L=\lambda_M/2$, where lambda is the wavelength of the slot mode which will be an averaged mixture of the dielectric/oxide layer, passivation layer, and air. Accordingly, the isolation feature embodiment of thermally isolating dielectric 134 in FIG. 3B may provide improved optical/IR performance as the dielectric portion is shorter than the ring version of FIG. 3A. The thermal isolation is reduced because there is no longer a continuous ring and instead there are four small gaps where thermally-conductive region connects from the device region outside to the ground. However, this conductive region is reduced in area compared to a version where there is no thermal isolation features.

The thermal isolation features of the thermally isolating dielectric 134 illustrated in FIG. 3B include (i) R resonator length, (ii) L thermal feature length, (iii) W thermal feature width, (iv) Γ device element unit cell area, and (v) S feature separation. These thermal isolation features can be adjusted for a wide range of PCM and passivation material combinations. According to an embodiment, the wavelengths ($\lambda_0$) may be 0.2 μm to 20 μm. The R resonator length may be $\lambda_D/2$, or in the range of $\lambda_D/2$ to $2\lambda_D$ or more. This could provide $\lambda_0/10$ to $\lambda_0$ or more depending on material properties. The L thermal feature length may be small with with respect to the wavelength of the mode supported in the feature. For example, the L thermal feature length is $L<\lambda_M/2$, where $\lambda_M$ is the wavelength of the slot mode which will be an averaged mixture of the dielectric/oxide layer, passivation layer, and air. The W thermal feature width depends on fabrication capability, and may be in the range of 0.05-1 μm for wavelengths ($\lambda_0$) in the range of 0.2 μm to 20 μm. The Γ unit cell depends on the operating wavelength, and may be in the range of $\lambda_0/20$ to $1.5\lambda_0$. The S feature separation has minimal, smaller dimensions so that device element region is compact and more device elements can fit in the optical device. The dimensions of the S feature separation depend on fabrication capability, and may be in range of 0.05-1 μm.

In a multi-color unit cell embodiment such as illustrated in FIGS. 2B-2C, each device element 202 in the multi-color unit cell $\mathbf{252}_m$ has a slightly different dimension, such as the antenna width dimension $W\lambda_n$ so that such device element operates at a different wavelength. In a multi-color unit cell, the thermal isolation features such as in the embodiment of thermally isolating dielectric 134 of FIG. 3B may be placed at each device element 202 so that thermal cross-talk between device elements is contained. The features of the thermally isolating 134 of FIG. 3B are all similar in shape and architecture, but each feature (or resonator) could be different shapes in a multi-color unit cell embodiment.

Figure 4:
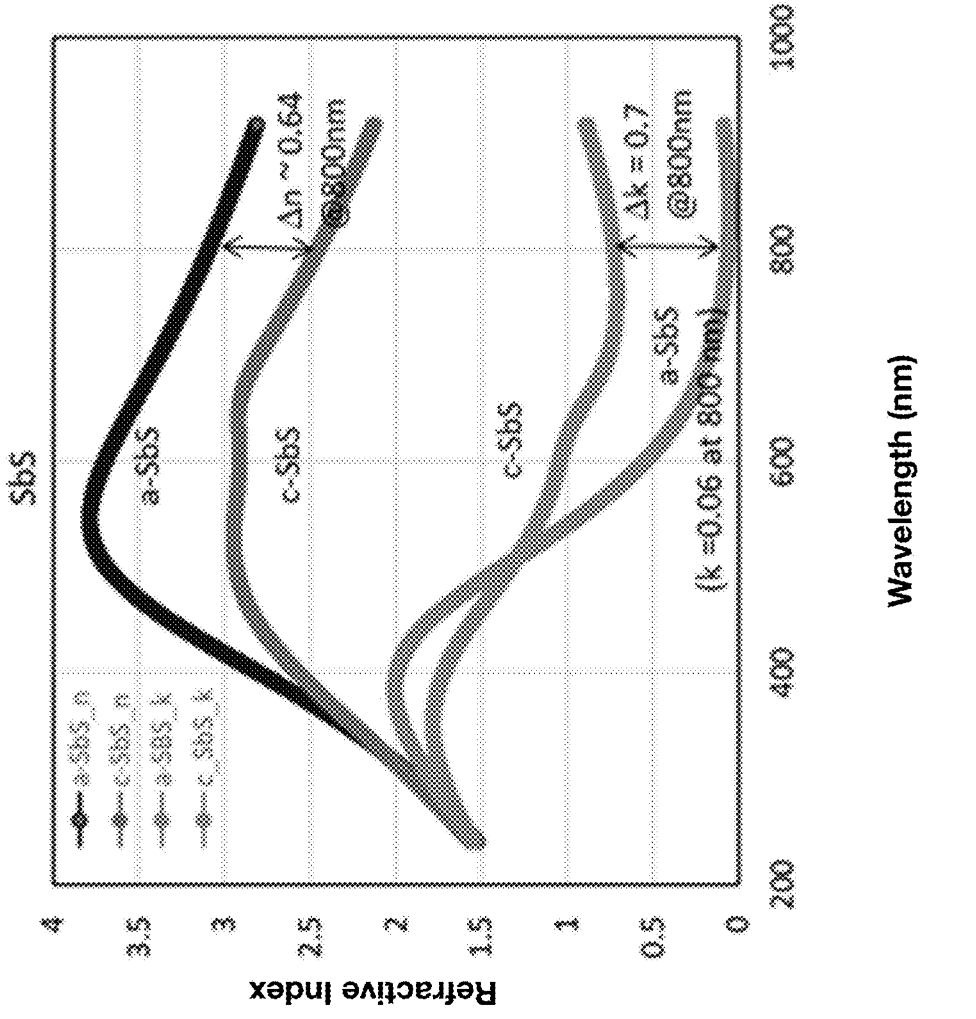
FIG. 4 shows refractive index measurements of a SbS PCM layer in the amorphous phase and in the polycrystalline phase in the device elements of a reconfigurable optical device embodiment shown in FIGS. 1A and 2A.

FIG. 4 shows measurements of both the real and imaginary parts of the refractive index, RI(n) and RI(k), of an SbS PCM layer in the amorphous phase (denoted by a) and in the polycrystalline phase (denoted by c) for a device element in the embodiments of FIGS. 1A and 2A. SbS phase change materials can offer a larger bandgap of ~1.5 eV suitable for reconfigurable optical devices in the visible spectrum. The O-PCM figure-of-merit (FOM) can be defined as [RI(kc)−RI(ka)]/RI(ka), where the RI(ka) sets the filter loss and resulting Q-factor and the Δk determines the optical loss when the filter is off (i.e., the PCM layer is in a polycrystalline phase). In FIG. 4, the measured RI of the SbS PCM layer shows that the large reduction in the optical extinction coefficient in near-infrared wavelength. SbS PCM layer has a change in the RI(k) of 0.7 at 800 nm wavelength with the amorphous phase RI(k) of 0.6. The O-PCM for the measured SbS PCM layer is 10 at 800 nm wavelength.

FIGS. 5A-5D illustrate cross-sectional views 502-518 from intermediate stages of fabricating the reconfigurable optical device of FIG. 1A, according to an embodiment.

Figure 5A:
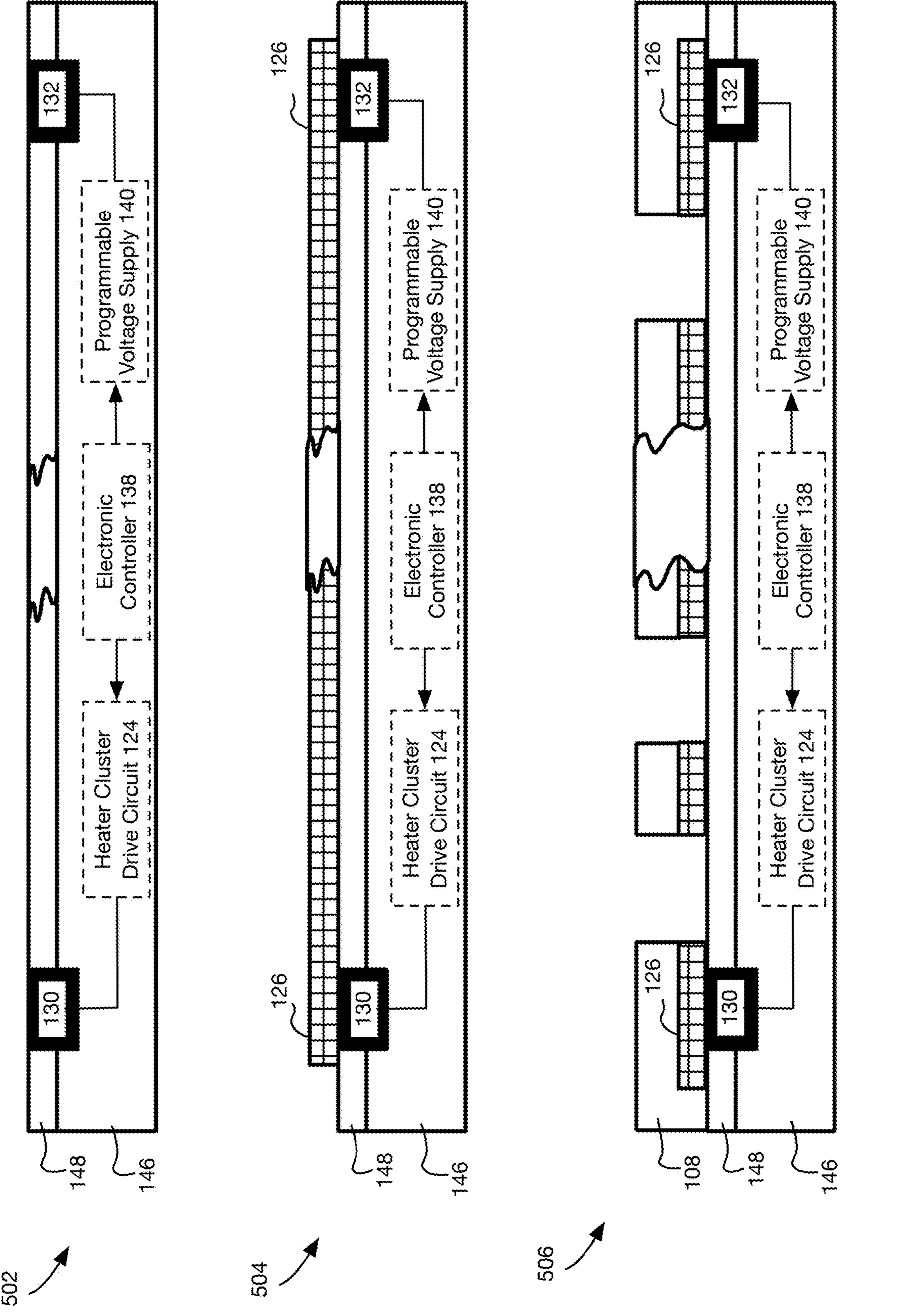
FIGS. 5A-5D illustrate cross-sectional views from intermediate stages of fabricating the reconfigurable optical device of FIG. 1A, according to one embodiment.

In FIG. 5A, cross-sectional view 502 illustrates device fabrication after intermediate step 502. The substrate 146 is prepared with an electrical circuit that is suitable for setting PCM layers 116 to selected amorphous or polycrystalline states. In a particular embodiment, the electrical circuit includes a heater cluster drive circuit 124, an electronic controller 138, and a programmable voltage supply 140. Atop the substrate, an isolating dielectric 148 is deposited that serves to electrically isolate the substrate from elements to be fabricated in subsequent steps. In an embodiment, the isolating dielectric 148 comprises silicon and oxygen and is deposited by a Chemical Vapor Deposition (CVD) or an Atomic Layer Deposition (ALD) method that is well known to those skilled in the art. Next, a patterning method is used (e.g., photolithography, followed by etch) to create openings in the isolating dielectric 148 that are subsequently filled with first via 130 and second via 132. The first via 130 and second via 132 are filled with conductive metals that enable electrical connections between specific elements in the electrical circuit in the substrate and subsequently fabricated structures. In an embodiment, the metals used in the first via 130 and second via 132 may comprise tungsten, copper, cobalt, titanium, titanium nitride, and/or some combination thereof. These metals may be deposited by physical vapor deposition (PVD), CVD, and/or ALD. The vias may be overfilled with metals and a subsequent chemical mechanical polishing step (CMP) is used to eliminate the excess metal and to planarize the surface.

Cross-sectional view 504 illustrates device fabrication after intermediate step 504. In an embodiment, an interconnect 126 is deposited over the entire structure. The interconnect 126 should have good electrically conductivity and may comprise Cu, Co, Al, Ti, TiN, W, and/or some combination thereof. The interconnect 126 may be deposited using methods well known in the art like PVD, CVD, and/or ALD. Following deposition, a patterning method, e.g., photolithography followed by etch, is used to remove unwanted portions of the interconnect 126.

Cross-sectional view 506 illustrates device fabrication after intermediate step 506. A heater plane dielectric 108 is deposited over the entire structure. In an embodiment, the heater plane dielectric 108 comprises silicon and oxygen and is deposited by a CVD or ALD. Openings are patterned in the heater plane dielectric using, for example, photolithography followed by etch. In an embodiment, a 2 step etch is used where by a first step is optimized to remove unwanted portions of the heater plane dielectric 108 and second step is optimized to remove unwanted portions of the interconnect 126.

Figure 5B:
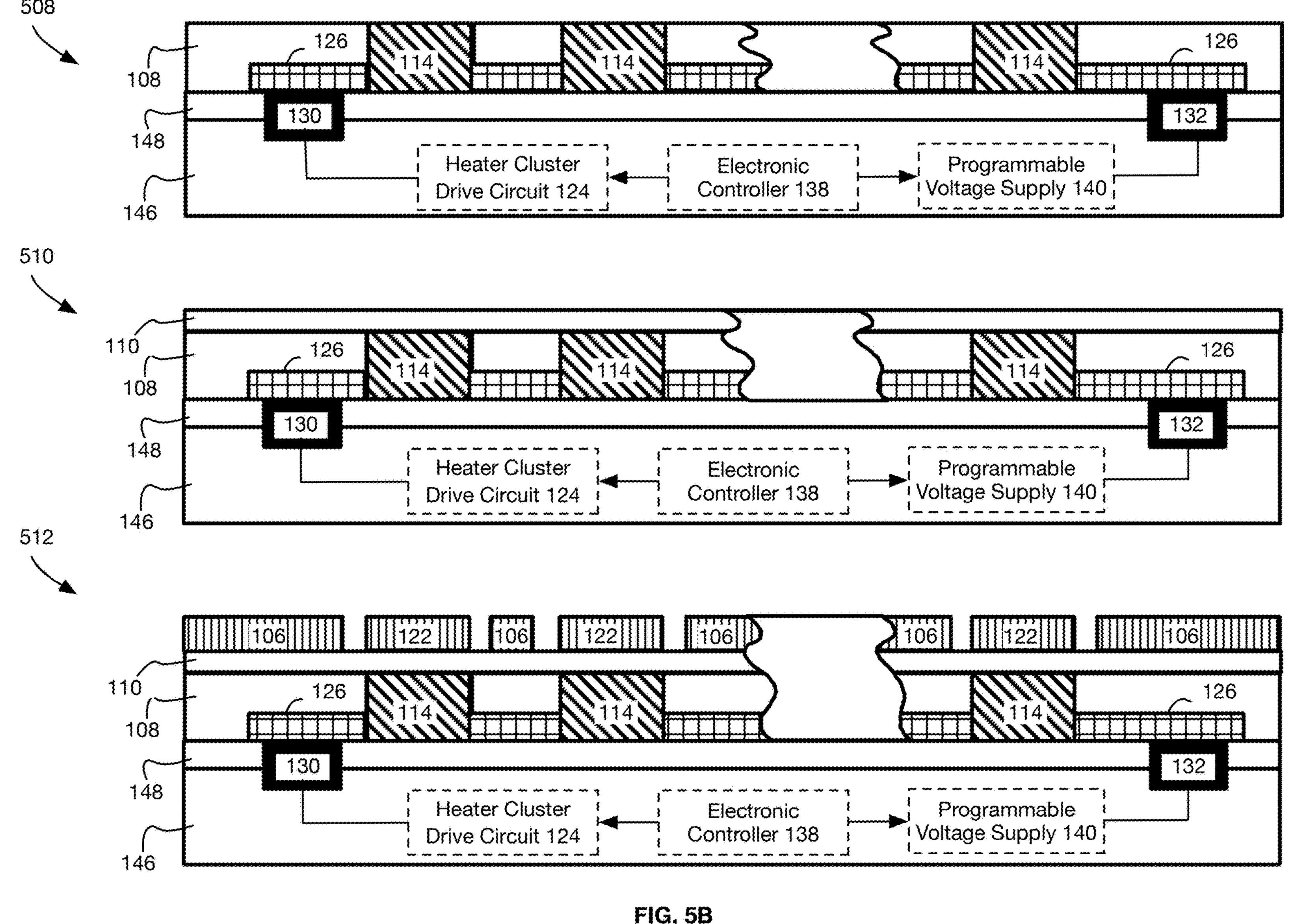

In FIG. 5B, cross-sectional view 508 illustrates device fabrication after intermediate step 508. At least 3 resistive heaters 114 are formed in the openings shown in intermediate step 506. In an embodiment, resistive heater material is TiW and is deposited by PVD or CVD. In a further embodiment, resistive heater material is deposited in the openings and on the surface of the heater plane dielectric 108. In a CMP step, the resistive heater material on the surface of the heater plane dielectric 108 is removed and the surface is planarized, producing the structure shown in step 508.

Cross-sectional view 510 illustrates device fabrication after intermediate step 510. A capping dielectric 110 is formed on the structure shown in step 508 to electrically isolate the resistive heaters from subsequently fabricated elements. In an embodiment, the capping dielectric 110 is the same material as the heater plane dielectric 108.

Cross-sectional view 512 illustrates device fabrication after intermediate step 512. A metal layer is deposited over the entire structure and is comprised of capping metal 122 and the field ground metal 106 portions. The metal layer serves as a broadband optical reflector and may include such materials as Au, Al, Pt, Cr, or Cu. If a thermal isolating dielectric 134 is not used, the metal layer remains over the reconfigurable optical device 100 with no breaks between the capping metal 122 and the field ground metal 106. If a thermal isolating dielectric 134 is used, a photolithography step followed by an etch may be used to create the openings between the capping metal 122 and the field ground metal 106 shown in step 512.

Figure 5C:
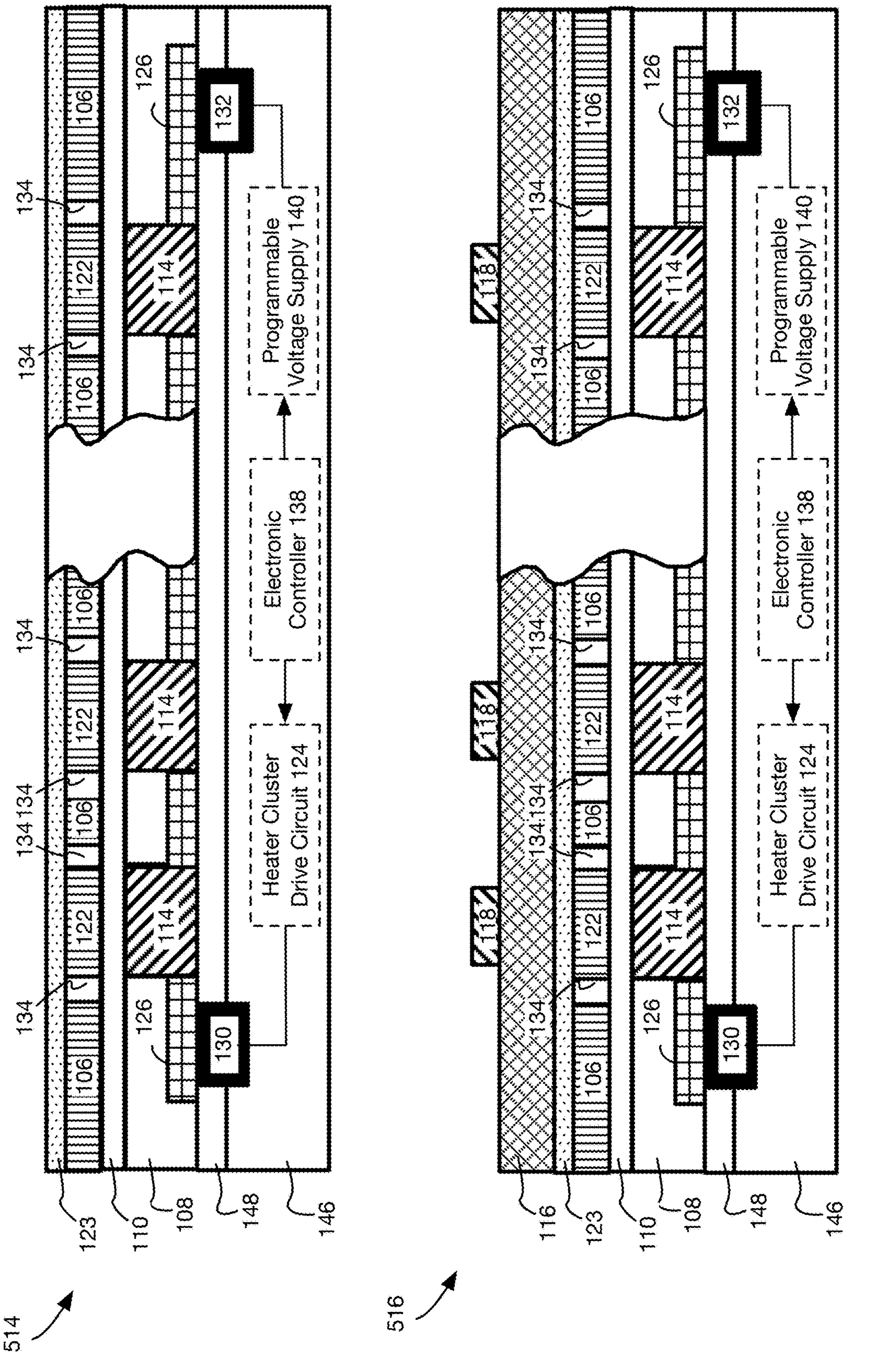

In FIG. 5C, cross-sectional view 514 illustrates device fabrication after intermediate step 514 for an embodiment with a thermally isolating dielectric 134. The thermally isolating dielectric should have a low thermal conductivity. In some embodiments, a low density dielectric is used, possibly with voids or an airgap. In an embodiment, the thermally isolating dielectric is deposited using CVD or ALD and containing Si and O. Deposition of the thermally isolating dielectric 134 will typically take place on the capping metal 122 and the field ground metal 106, in addition to in the openings shown in step 512. In an embodiment, the thermally isolating dielectric on the capping metal 122 and the field ground metal 106 will be removed by, for example, an etch or CMP step. In an optional embodiment, an interfacial layer 123 is deposited. In a further embodiment, the interfacial layer is comprised of tantalum or silicon nitride.

Cross-sectional view 516 illustrates device fabrication after intermediate step 516. A phase change material (PCM) layer 116 comprising a chalcogenide-containing material is deposited on the structure. In embodiments, the chalcogenide-containing material is selected from the group consisting of SbS, SbSe, SbTe, or an alloy thereof. The PCM layer 116 may be deposited by ALD, CVD, or PVD techniques. Next, an optical antenna 118 is formed atop the PCM layer 116. In an embodiment, the optical antenna 118 is formed by a liftoff process that is well known in the art. Briefly, a resist material is deposited on the structure and a lithographic method (e.g., e-beam lithography or photolithography) is used to pattern the resist material with openings above the heater. The optical antenna material is then deposited over the entire structure, with some portions atop the remaining resist and some portions directly atop the PCM layer 116. The remaining resist is then dissolved away and the unwanted portions of the deposited optical antenna material are "lifted off" and removed. The resultant structure with the formed and patterned optical antennas 118 is shown in step 516. In an alternate embodiment, the optical antenna 118 is formed by first depositing the optical antenna material on the structure, followed by a lithographic patterning of a resist material with openings corresponding to unwanted portions of the optical antenna material, followed by an etch the removes the exposed regions of the optical antenna material, followed by removal of the resist. Once again, the optical antenna structure of step 516 will result. In an embodiment, the optical antenna 116 consists of metal (e.g., Au, Al, Pt, Cr, and/or Cu). In an alternate embodiment, the optical antenna 116 consists of a dielectric material. In an embodiment, a beveled profile for the optical antenna 116 is fabricated, where an angle between the bottom and a side of the optical antenna 118 is between 45 and 80 degrees.

Figure 5D:
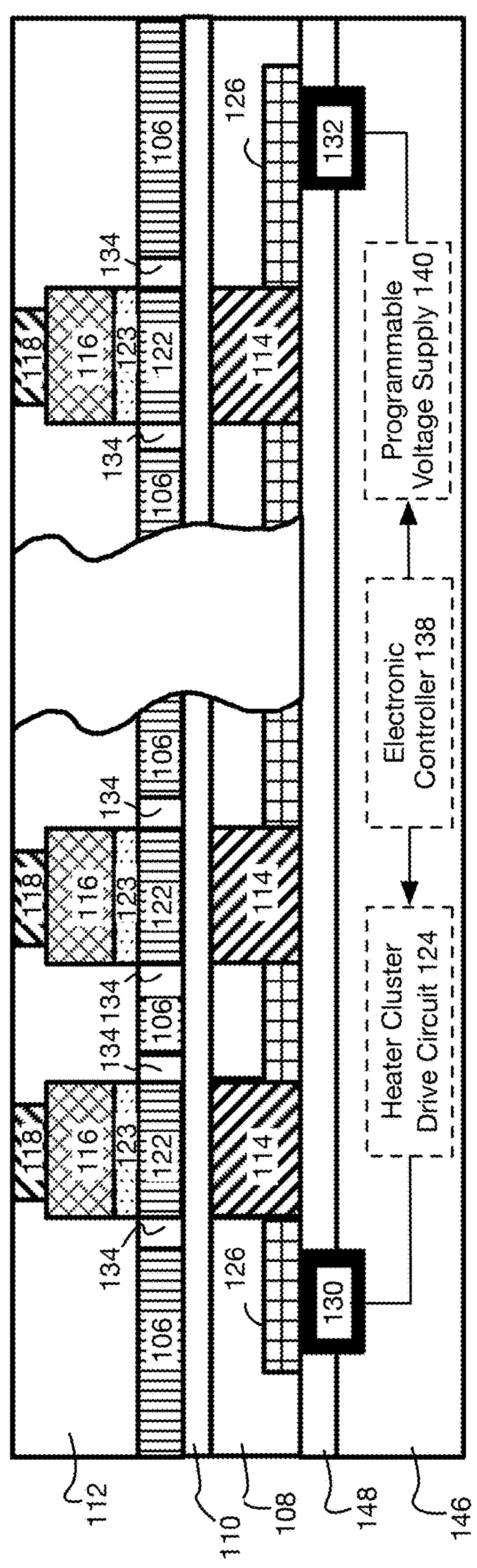

In FIG. 5D, cross-sectional view 518 illustrates device fabrication after step 518. Following step 516, a patterned etch step is performed to remove unwanted portions of PCM layer 116 and optional interfacial layer 123 that are not above the resistive heaters 114. A two-step etch process may be used whereby the first etch step selectively removes the PCM layer 116 with a high etch rate, but does not etch (or only slowly etches) the interfacial layer 123. This allows the interfacial layer 123 to be used as an etch stop layer, which has the benefit of providing excellent etch margin to completely removed unwanted portions of the PCM layer material without etch punch through risk to the underlying field ground metal 106, capping metal 122, and thermal isolating dielectric 134. In the second etch step, the exposed interfacial layer 123 is removed. Following removal of the patterning layer used during the etch, a passivating layer 112 is deposited and optionally planarized with a CMP step, producing the structure shown in step 516.

Figure 6B:
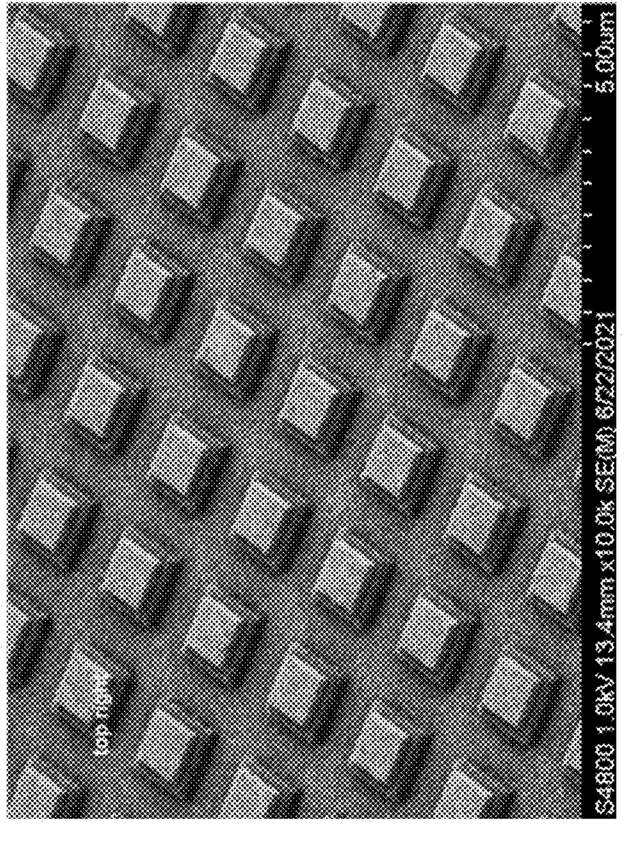
FIGS. 6A-6B are SEM images illustrating the top surface of reconfigurable optical device elements with uniform antenna and PCM layer component fabrication configured for the mid-wave infrared (MWIR) spectral range (FIG. 6A) and the long-wave infrared (LWIR) spectral range (FIG. 6B), according to an embodiment.
Figure 6A:
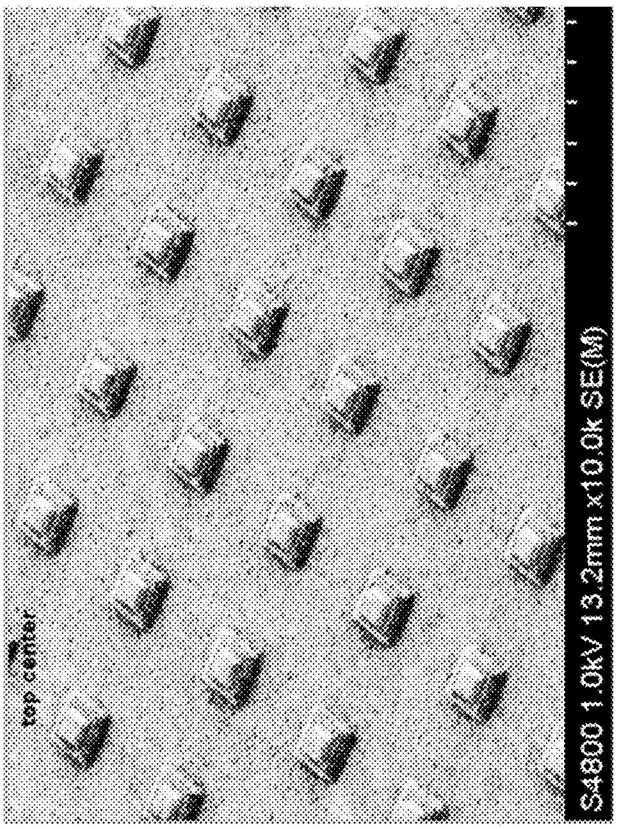

FIGS. 6A and 6B show SEM images of a plurality of device elements with antenna and PCM layer components fabricated using the method of FIG. 5, prior to the formation of the encapsulating dielectric 112. The SEM images show uniform antenna fabrication in the antenna array integrated with amorphous PCM layer components for notch filters in the mid-wave infrared (SEM Image in FIG. 6A) and in the long-wave infrared ranges (SEM Image in FIG. 6B). These SEM images illustrate a bevel on the sides of the optical antenna.

A number of example embodiments have been described. Nevertheless, it will be understood that various modifications may be made without departing from the spirit and scope of the devices and methods described herein.

What is claimed is:

1. A reconfigurable optical device comprising: a substrate comprising an electrical circuit; a plurality of device elements above the substrate that corresponds to a wavelength X, wherein each of the device elements are separated by a first pitch along a first direction and a second pitch along a second direction that is not parallel to the first direction, and the first pitch and the second pitch are each less than the wavelength X; a field ground metal; a heater plane dielectric; a capping dielectric; an encapsulating dielectric; and each device element in the plurality of device elements comprising: a resistive heater that is surrounded by the heater plane dielectric; a phase change material (PCM) layer comprising a chalcogenide-containing material; an optical antenna disposed atop the PCM layer; a capping portion of the capping dielectric above the resistive heater; and a capping metal above the capping portion and the resistive heater, wherein the capping metal and the field ground metal are the same material; wherein: the field ground metal is between each of the device elements; the encapsulating dielectric surrounds the PCM layer and the optical antenna in each of the device elements; and at least three device elements in the plurality of device elements have their respective resistive heaters connected in series to the electrical circuit in the substrate.

2. The reconfigurable optical device of claim 1, wherein the electrical circuit enables electrical pulses to the respective resistive heaters for changing the material phase of the PCM layers to amorphous or polycrystalline.

3. The reconfigurable optical device of claim 1, wherein for each device element in the plurality of device elements about 60% to 100% of the wavelength λ is reflected when the PCM layer is polycrystalline.

4. The reconfigurable optical device of claim 1, wherein for each device element in the plurality of device elements about 0% to 40% of the wavelength λ is reflected when the PCM layer is amorphous.

5. The reconfigurable optical device of claim 1, wherein the chalcogenide-containing material is selected from the group consisting of SbS, SbSe, SbTe, or an alloy thereof.

6. The reconfigurable optical device of claim 5, wherein the thermally isolating dielectric comprises thermally isolating dielectric segments that are less than or equal to wavelength λ/2.

7. The reconfigurable optical device of claim 5, wherein the width of the thermally isolating dielectric is less than or equal to the wavelength λ/5.

8. The reconfigurable optical device of claim 1, further comprising a thermally isolating dielectric, wherein for each device element in the plurality of device elements, the thermally isolating dielectric at least partially separates the capping metal above the resistive heater from the field ground metal.

9. The reconfigurable optical device of claim 8, wherein the thermally isolating dielectric forms a closed loop that fully separates the capping metal above the resistive heater from the field ground metal.

10. The reconfigurable optical device of claim 8, wherein the thermally isolating dielectric comprises at least 4 breaks occurring at regular intervals such that there are at least 4 locations of contact between the capping metal above the resistive heater and the field ground metal.

11. The reconfigurable optical device of claim 8, wherein the thermally isolating dielectric has four-fold symmetry about an axis through the center of the antenna.

12. The reconfigurable optical device of claim 1, wherein the optical antenna has a width that is less than or equal to the wavelength λ/5.

13. The reconfigurable optical device of claim 1, wherein the PCM layer has a width that is less than or equal to the wavelength λ/4.

14. The reconfigurable optical device of claim 1, wherein the resistive heater has a width that is less than or equal to the wavelength λ/3.

15. The reconfigurable optical device of claim 1, wherein the optical antenna comprises a metal material.

16. The reconfigurable optical device of claim 1, wherein the optical antenna comprises a dielectric material.

17. The reconfigurable optical device of claim 1, wherein the heater plane dielectric and the capping dielectric are the same material.

18. The optical device of claim 1, further comprising an interfacial layer between the capping metal and the PCM layer.

19. The optical device of claim 1, wherein the first direction and the second direction are perpendicular.

20. A reconfigurable optical device comprising: a substrate comprising an electrical circuit; a plurality of $n^{th}$ device elements above the substrate that corresponds to an $n^{th}$ wavelength X, wherein n is an integer 1 to N, N is an integer of 2 or more and corresponds to the number of wavelengths that are reconfigurable to a reflective or absorbing state for the optical device, the $n^{th}$ device elements are interlaced with other device elements, and each of the $n^{th}$ device elements are separated by a first pitch along a first direction and a second pitch along a second direction that is not parallel to the first direction, where the first pitch and the second pitch are each less than the $n^{th}$ wavelength X; a field ground metal; a heater plane dielectric; a capping dielectric; an encapsulating dielectric; and each device element in the $n^{th}$ device elements comprising: a resistive heater that is surrounded by the heater plane dielectric; a phase change material (PCM) layer comprising a chalcogenide-containing material; an optical antenna disposed atop the PCM layer; a capping portion of the capping dielectric above the resistive heater; a capping metal above the capping portion and the resistive heater, wherein the capping metal and the field ground metal are the same material; and at least one dimension of either the PCM layer or the optical antenna that is tuned to the $n^{th}$ wavelength k; wherein: the field ground metal is between each of the $n^{th}$ device elements; the encapsulating dielectric surrounds the PCM layer and the optical antenna in each of the $n^{th}$ device elements; and at least three device elements in the plurality of $n^{th}$ device elements have their respective resistive heaters connected in series to the electrical circuit in the substrate.

21. The reconfigurable optical device of claim 20, wherein the electrical circuit enables electrical pulses to the respective resistive heaters for changing the material phase of the PCM layers to amorphous or polycrystalline.

22. The reconfigurable optical device of claim 20, wherein the chalcogenide-containing material is selected from the group consisting of SbS, SbSe, SbTe, or an alloy thereof.

23. The reconfigurable optical device of claim 20, further comprising a thermally isolating dielectric, wherein for each device element in the plurality of device elements, the thermally isolating dielectric at least partially separates the capping metal above the resistive heater from the field ground metal.

24. The reconfigurable optical device of claim 23, wherein the thermally isolating dielectric forms a closed loop that fully separates the capping metal above the resistive heater from the field ground metal.

25. The reconfigurable optical device of claim 20, wherein the $n^{th}$ device elements are interlaced with $q^{th}$ device elements that correspond to a $q^{th}$ wavelength $\lambda_q$, where q is an integer 1 to N and q does not equal n.

* * * * *